United States Patent [19]
Whittenberger et al.

[11] Patent Number: 5,546,746
[45] Date of Patent: Aug. 20, 1996

[54] CORE ELEMENT USEFUL IN A COMBINED ELECTRICALLY HEATABLE AND LIGHT-OFF CONVERTER

[75] Inventors: William A. Whittenberger, Leavittsburg, Ohio; Edward T. Woodruff, Woodbine, Md.

[73] Assignee: W. R. Grace & Co.-Conn., New York, N.Y.

[21] Appl. No.: 322,258

[22] Filed: Oct. 13, 1994

Related U.S. Application Data

[63] Continuation-in-part of Ser. No. 13,516, Feb. 4, 1993, abandoned.
[51] Int. Cl.$^6$ ............................. F01N 3/20; B60L 1/02
[52] U.S. Cl. ..................... 60/274; 60/300; 219/202; 392/479; 422/174; 422/180
[58] Field of Search ................ 60/274, 300; 422/174, 422/180; 219/202; 392/479

[56] References Cited

U.S. PATENT DOCUMENTS

| | | | |
|---|---|---|---|
| 3,768,982 | 10/1973 | Kitzner . | |
| 3,770,389 | 10/1973 | Kitzner . | |
| 3,795,524 | 3/1974 | Sowman | 106/65 |
| 3,916,057 | 10/1975 | Hatch | 428/236 |
| 4,273,681 | 6/1981 | Nonnenmann | 252/472 |
| 4,381,590 | 5/1983 | Nonnenmann . | |
| 4,414,023 | 11/1983 | Aggen | 75/124 |
| 4,671,931 | 6/1987 | Herchenroeder | 420/445 |
| 4,711,009 | 12/1987 | Cornelison et al. . | |
| 4,810,588 | 3/1989 | Bullock | 428/603 |
| 5,055,275 | 10/1991 | Kannainen | 422/180 |
| 5,070,694 | 12/1991 | Whittenberger | 60/300 |
| 5,146,743 | 9/1992 | Maus et al. | 60/274 |
| 5,149,508 | 9/1992 | Bullock | 392/479 |
| 5,272,876 | 12/1993 | Sheller | 60/300 |

FOREIGN PATENT DOCUMENTS

| | | |
|---|---|---|
| 0569109A1 | 10/1993 | European Pat. Off. . |
| 4131970A1 | 4/1992 | Germany . |
| WO9213636 | of 0000 | WIPO . |
| WO89/10471 | 11/1989 | WIPO . |
| WO89/10470 | 11/1989 | WIPO . |
| WO90/12951 | 11/1990 | WIPO . |
| WO92/13636 | 8/1992 | WIPO . |
| WO9321431 | 10/1993 | WIPO . |

OTHER PUBLICATIONS

SAE Paper #890799 "Resistive Materials Applied to Quick Light–Off Catalysts" Hellman et al, Feb. 27–Mar. 3, 1989.

German 4,102,890 Al dated Aug. 6, 1992.

*Primary Examiner*—Douglas Hart
*Attorney, Agent, or Firm*—Beverly J. Artale

[57] ABSTRACT

There is provided an improved core element for use in converters, especially catalytic converters. The core is characterized by two portions one of which portions is capable of being electrically heated, and the other of which is isolated from the first portion electrically and thermally and is called a light-off portion. A plurality of core elements is wrapped about a central rigid metallic pin and the assembly tightly spirally wound about the pin to form the core, part of which is electrically heatable and the other of which is not heated electrically. The core is formed from a plurality of composite core elements, each including a corrugated strip backed up with a flat two-member strip, one band of the two-member flat strip being of generally relatively narrow width, contiguous with the leading portion of the corrugated strip, and the other band contiguous with the trailing portion of the corrugated strip and usually being of relatively greater width. The narrow flat band is electrically heatable, and the two flat bands lie in essentially the same plane (when unrolled, or developed) and are spaced one from the other so as to be out of electrical contact. The invention also contemplates a catalytic converter formed of the core elements hereof, and a method of accelerating the catalytic response of a catalytic converter.

35 Claims, 5 Drawing Sheets

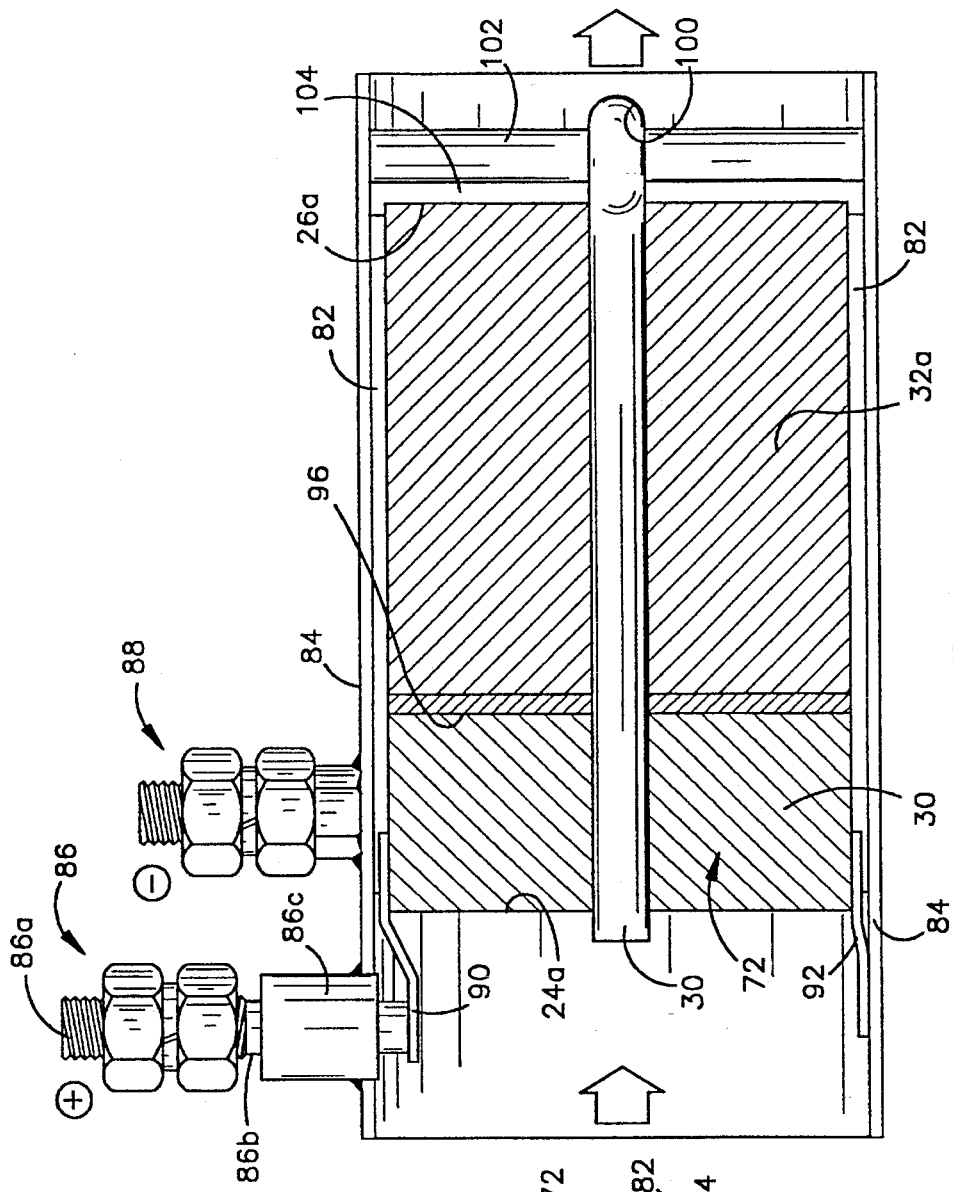
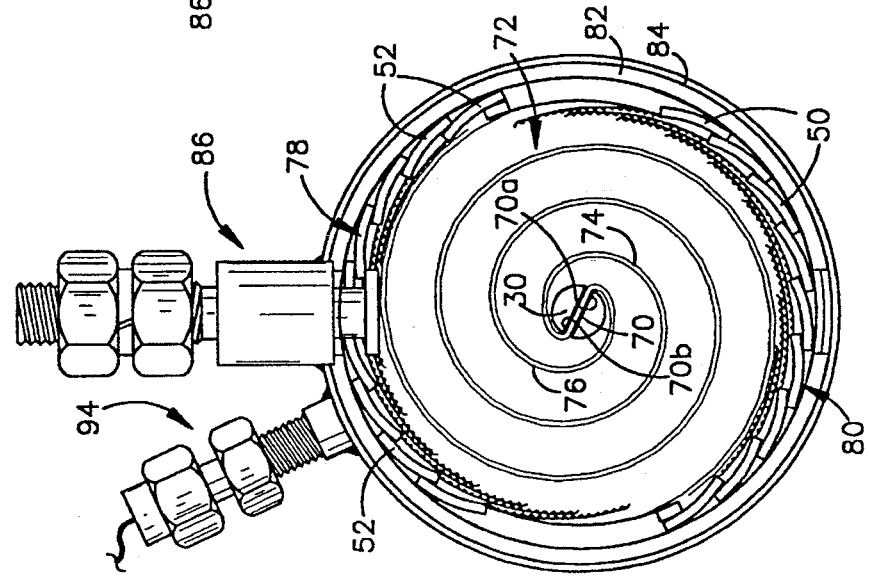
Fig.3
Fig.2

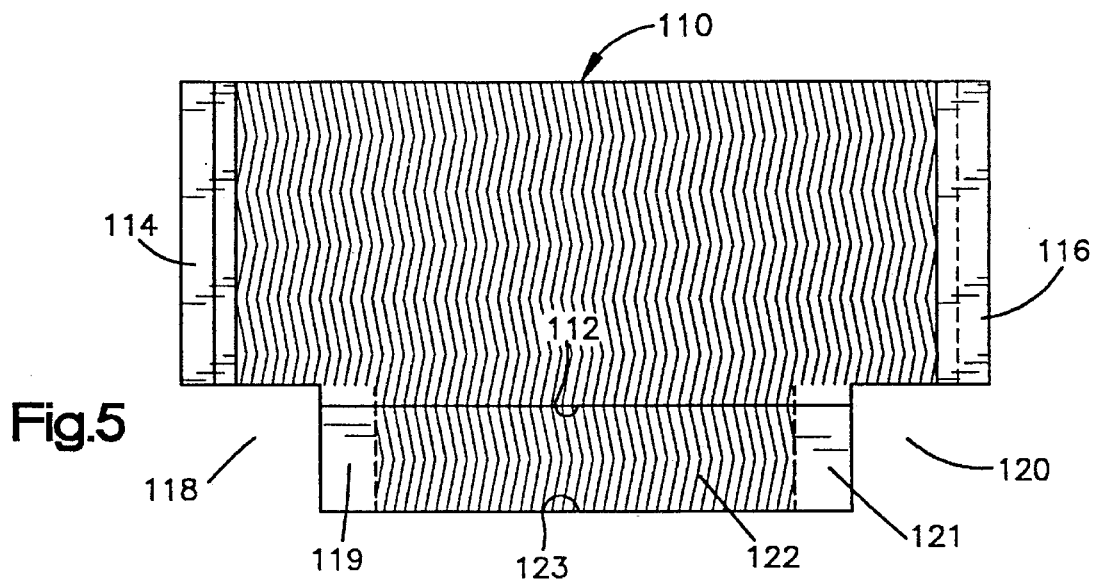
Fig.5
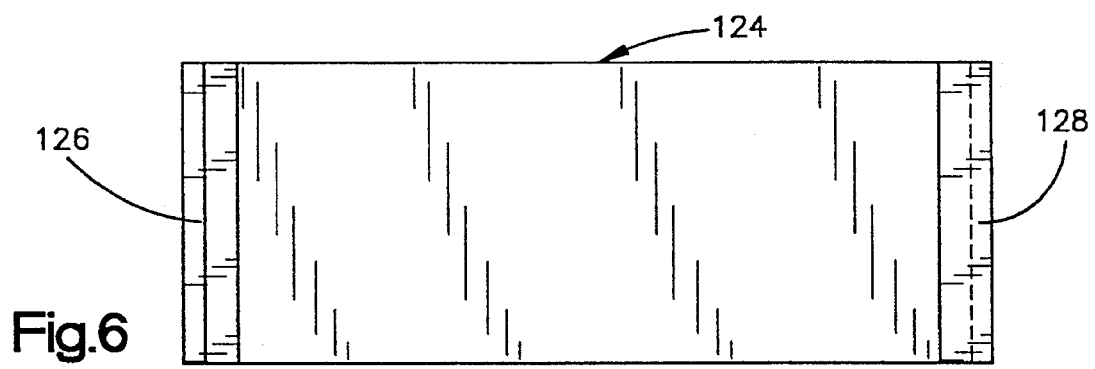
Fig.6
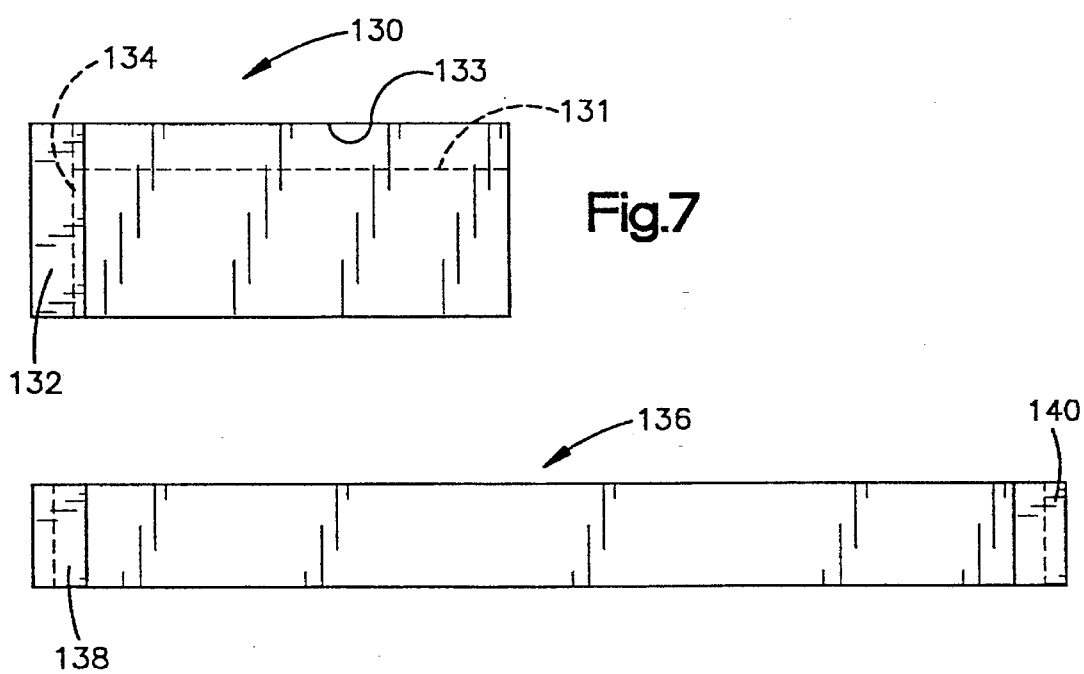
Fig.7
Fig.8

CORE ELEMENT USEFUL IN A COMBINED ELECTRICALLY HEATABLE AND LIGHT-OFF CONVERTER

RELATED APPLICATION

This application is a continuation-in-part of our application Ser. No. 08/013,516 filed 3 Feb. 1993, now abandoned.

This invention relates to a core element which is useful in forming a core through which a gas is passed, e.g., exhaust gas from an internal combustion engine or a gas turbine engine, or a stream of volatile organic emissions, for the purpose of undergoing chemical reaction, e.g., oxidation. A plurality of such core elements is normally used in the core. A catalyst may be present in the core. These core elements are used in making converters, especially catalytic converters, particularly for automotive vehicles, which treat pollutant-laden exhaust gases in such a way as to reduce the exhaust pollutants to an acceptable level. While the following discussion will be limited to catalytic converters for vehicles, it will be understood that the principles hereof apply to stationary as well as mobile devices, and to chemical reactors other than converters for exhaust gas pollutants.

BACKGROUND OF THE INVENTION AND PRIOR ART

The purpose of a catalytic converter for an internal combustion engine or a gas turbine is to convert pollutant materials present in the exhaust, e.g., carbon monoxide, unburned hydrocarbons, nitrogen oxides, etc., to carbon dioxide, nitrogen and water. Conventional automotive catalytic converters utilize an oval or round cross-section ceramic honeycomb monolith having square or triangular straight-through openings or cells with catalyst deposited on the walls of the cells; catalyst coated refractory metal oxide beads or pellets, e.g., alumina beads; or a corrugated thin metal foil multicelled honeycomb monolith, e.g., a ferritic stainless steel foil honeycomb monolith, or a nickel alloy foil honeycomb monolith, having a refractory metal oxide coating and catalyst carried thereon or supported on the surface of the cells. The catalyst is normally a noble metal, e.g., platinum, palladium, rhodium, ruthenium, or a mixture of two or more of such metals. Zeolite coatings may also be used for the absorption and desorption of the pollutants to aid in catalytic activity. The catalyst catalyzes a chemical reaction, mainly oxidation, whereby the pollutant is converted to a harmless by-product which then passes through the exhaust system to the atmosphere.

However, conversion to such harmless by-products is not efficient initially when the exhaust gases are relatively cold, e.g., at cold engine start. To be effective at a high conversion rate, the catalyst and the surface of the converter which the exhaust gases contact must be at or above a minimum temperature, e.g., 390 F. for carbon monoxide, 570 F. for volatile organic compounds (VOC), and about 900 F. for methane or natural gas. Otherwise conversion to harmless by-products is poor and cold start pollution of the atmosphere is high. It has been estimated that as much as 80% of the atmospheric pollution caused by vehicles, even though equipped with conventional non-electrically heated catalytic converters, occurs in the first 2 minutes of operation of the engine. Once the exhaust system has reached its normal operating temperature, an unheated catalytic converter is optimally effective. Hence, it is necessary for the relatively cold exhaust gases to make contact with hot catalyst so as to effect satisfactory conversion. Compression ignited engines, spark ignited engines, reactors in gas turbines, small bore engines such as used in lawn mowers, trimmers, boat engines, and the like, have this need.

To achieve initial heating of the catalyst at engine start-up, there is conveniently provided an electrically heatable catalytic converter unit, preferably one formed of a thin metal honeycomb monolith. This monolith may be formed of spaced flat thin metal strips, straight corrugated thin metal strips, pattern corrugated thin metal strips, (e.g., herringbone or chevron corrugated), or variable pitch corrugated thin metal strips (such as disclosed in U.S. Pat. No. 4,810,588 dated 7 Mar. 1989 to Bullock et al) or a combination thereof, which monolith is connected to a voltage source, e.g., a 12 volt to 108 volt or higher, AC or DC power supply, preferably at the time of engine start-up and afterwards to elevate the catalyst to and maintain the catalyst at at least 650 F. plus or minus 30 F. Alternatively, power may be also supplied for a few seconds prior to engine start-up.

Catalytic converters containing a corrugated thin metal (stainless steel) monolith have been known since at least the early 1970's. See Kitzner U.S. Pat. Nos. 3,768,982 and 3,770,389 each dated 30 Oct. 1973. More recently, corrugated thin metal monoliths have been disclosed in U.S. Pat. No. 4,711,009 dated 8 Dec. 1987; U.S. Pat. No. 4,381,590 dated 3 May 1983 to Nonnenmann et al, U.S. Pat. No. 5,070,694 dated 10 Dec. 1991 to Whittenberger; and International PCT Publication Numbers WO 89/10470 (EP 412, 086) and WO 89/10471 (EP 412,103) each filed 2 Nov. 1989, claiming a priority date of 25 Apr. 1988. The above International Publication Numbers disclose methods and apparatus for increasing the internal resistance of the device by placing spaced discs in series, or electrically insulating intermediate layers. Another International PCT Publication Number is WO 90/12951 published 9 Apr. 1990 and claiming a priority date of 21 Apr. 1989, which seeks to improve axial strength by form locking layers of insulated plates. Another reference which seeks to improve axial strength is U.S. Pat. No. 5,055,275 dated 8 Oct. 1991 to Kannainian et al. Reference may also be had to PCT Publication Number WO 92/13636 claiming a priority date of 31 Jan. 1991. This application relates to a honeycomb body along an axis of which a fluid can flow through a plurality of channels. The honeycomb body has at least two discs in spaced relation to each other. According to the specification, there is at least one support near the axis by which the discs are connected together and mutually supported. The invention is said to make possible design of the first disc for fast heating up through exhaust gas passing through or applied electrical current. The honeycomb body serves as a bearer for catalyst in the exhaust system of an internal combustion engine. Another reference is German Patent Application number 4,102,890 A1 filed 31 Jan. 1991 and published 6 Aug. 1992. This application discloses a spirally wound corrugated and flat strip combination wherein the flat strip contains slots and perforations and is electrically heatable. The flat strips include a bridge between leading and trailing portions. Groups of such strips are separated by insulation means. The core is provided with a pair of circular retainer segments which are separated by insulation means. No end tabs are provided, and the flat strip portions are integral. A principal difference between the German Application and the present case is that the electrical current flow through the heater in the reference is "nonhomogeneous" whereas in the present case the electrical current flow is homogeneous.

A common problem with such prior devices has been their inability to survive severe automotive industry durability, or proof, tests which are known as the Hot Shake Test and the Hot Cycling Test.

The Hot Shake Test involves oscillating (100 to 200 Hertz and 28 to 60 G inertial loading) the device in a vertical attitude at high temperature (between 800 and 950 C.; 1472 to 1742 F., respectively) with exhaust gas from a running internal combustion engine simultaneously passing through the device. If the catalytic device telescopes or displays separation or folding over of the leading or upstream edges of the foil leaves up to a predetermined time, e.g., 5 to 200 hours, the device is said to fail the test. Usually a device that lasts 5 hours will last 200 hours. Five hours is equivalent to 1.8 million cycles at 100 Hertz.

The Hot Cycling Test is conducted with exhaust flowing at 800 to 950 C. (1472 to 1742 F.) and cycled to 120 to 150 C. once every 15 to 20 minutes, for 300 hours. Telescoping or separation of the leading edges of the thin metal foil strips is considered a failure.

The Hot Shake Test and the Hot Cycling Test are hereinafter called "Hot Tests," and have proved very difficult to survive. Many efforts to provide a successful device have been either too costly or ineffective for a variety of reasons.

The structures of the present invention will survive these Hot Tests.

Early embodiments of electrically heatable catalytic converters were relatively large, especially in an axial direction, e.g. 7 to 10 or more inches long and up to 4.5 inches in diameter. These were inserted into an exhaust system either as a replacement for the conventional catalytic converter now in common use, or in tandem relation with such conventional catalytic converter in the exhaust line. Then it was found that an axially relatively thin or "pancake," electrically heated corrugated thin metal honeycomb monolith could be used in close tandem relation with the conventional catalytic converter.

It was later found that even better performance resulted from a "cascade" of converters, i.e., a low thermal inertia electrically heatable converter (EHC), followed by a medium thermal inertia converter, followed by a large thermal inertia main converter, all on generally the same axis of gas flow. This solution provided for fast, economical heating of the EHC. Heat generated from an oxidation reaction initiated in the EHC then heated the intermediate converter which in turn heated the large converter.

It should be noted that the electrically heatable honeycomb acts to preheat the exhaust gas to its "light-off" temperature where, in the presence of catalyst, the pollutants are converted. Some conversion occurs in the electrically heatable device, and most of the conversion occurs in the final catalytic converter section which is normally not electrically heated.

It has now been found that a "pancake" electrically heatable device and a conventional metal monolith catalytic converter may be positioned together within a common housing to take advantage of the common diameter and/or geometric configuration in a cascading device, and having a shorter axial length than required in either the tandem relation or the prior cascade relation. While in the present devices there are still three units of differing thermal inertia in a "cascade," instead of a three structural member cascade device, the present structure enables a two member cascade device. A still further advantage of the present device is that it facilitates manufacture from thin metal strips, to form both the electrically heatable portion and the conventional metal monolith catalytic converter portion, or "light-off" portion, for encasing in a single housing. The dual purpose devices of the present invention may be backed up with a conventional catalytic converter of, for example, the commonly used ceramic type, the alumina pellet type, or the metal monolith honeycomb type mentioned above. Thus, the advantages of the cascade effect for successive light-off may be utilized without encountering a number of the problems associated therewith. Avoiding substantial electrical heating of the major portion of the thin metal honeycomb effects a major saving in electrical power required, which is one reason for the "pancake," or axially relatively thin, e.g., less than 2", structure in the first place. The small thermal mass of the "pancake" device enables very short heat up times, i.e., a matter of a very few seconds. Oxidation of the pollutant materials in the exhaust gas is initiated in the "pancake" portion and the resulting exotherm further heats the exhaust gas and the subsequent "light-off" converter to effect substantial completion of the oxidation of the pollutant materials in the presence of a catalytic agent or agents.

In the following description, reference will be made to "ferritic" stainless steel. A suitable ferritic stainless steel alloy is described in U.S. Pat. No. 4,414,023 dated 8 Nov. 1983 to Aggen. A specific ferritic stainless steel useful herein contains 20% chromium, 5% aluminum, and from 0.002% to 0.05% of at least one rare earth metal selected from cerium, lanthanum, neodymium, yttrium, and praseodymium, or a mixture of two or more of such rare earth metals, balance iron and trace steel making impurities. Another metal alloy especially useful herein is identified as Haynes 214 alloy which is commercially available. This and other nickeliferous alloys are described in U.S. Pat. No. 4,671,931 dated 9 Jun. 1987 to Herchenroeder et al. These alloys are characterized by high resistance to oxidation. A specific example contains 75% nickel, 16% chromium, 4.5% aluminum, 3% iron, optionally trace amounts of one or more rare earth metals except yttrium, 0.05% carbon, and steel making impurities. Haynes 230 alloy, also useful herein, has a composition containing 22% chromium, 14% tungsten, 2% molybdenum, 0.10% carbon, and a trace amount of lanthanum, and balance nickel. Ferritic stainless steel (commercially available from Allegheny Ludlum Steel Co. under the trademark "Alfa IV") and the Haynes alloys are examples of high temperature resistive, oxidation resistant (or corrosion resistant) metals that are suitable for use in making thin metal strips for use in the converters hereof, and particularly for making heater strips for cores that may be electrically heated. Suitable metals must be able to withstand temperatures of 900 C. to 1100 C. over prolonged periods.

Other high temperature resistive, oxidation resistant resistant metals are known and may be used herein. For most applications, and particularly automotive applications, these alloys are used as "thin" metal strips, that is, having a thickness of from 0.001" to 0.005", and preferably 0.0015" to 0.0025".

In the following description, reference will also be made to fibrous ceramic mat, woven ceramic fiber tape or fabrics, or insulation. Reference may had to U.S. Pat. No. 3,795,524 dated 5 Mar. 1974 to Sowman and to U.S. Pat. No. 3,916,057 dated 28 Oct. 1975 to Hatch, for formulations and manufacture of ceramic fiber tapes and mats useful herein. One such woven ceramic fiber material is currently available from 3-M under the registered trademark "NEXTEL" 312 Woven Tape and is useful for insulation of thin metal strips as described below. Ceramic fiber mat is commercially available as "INTERAM" also from 3-M.

BRIEF STATEMENT OF THE INVENTION

Briefly stated, the present invention is a core element useful in a combined electrically heatable catalytic converter and a light-off converter. The core element hereof is characterized by a pair of thin metal strips, or metal foil strips, each having a longitudinally extending leading portion including the leading edge, and a longitudinally extending trailing portion including the trailing edge. One strip includes means for at least partially isolating one portion from the other electrically and thermally. In more specific embodiments, the core element is a composite strip as hereinafter described, of predetermined length and width, which strip includes a corrugated thin metal strip, and a flat strip in contiguous relation therewith which flat strip includes means for directing all of the electric current to pass through the longitudinally extending leading portion. These means also serve to limit heat generated in the leading portion from conductive heat transfer to the trailing portion.

This invention also contemplates a unitary catalytic converter unit, i.e., one having the EHC (electrically heated converter) and the light-off converter together in close proximity, or juxtaposed, in the same housing, and including core elements of the present invention.

BRIEF DESCRIPTION OF THE DRAWINGS

The invention may be better understood by having reference to the annexed drawings showing preferred embodiments of the invention, and wherein:

FIG. 2 is an end view of a catalytic converter in accordance with the present invention viewed from the gas inlet end which includes an electrically heatable catalytic converter portion and showing an electrical power terminal and the spiral winding of a plurality of the core elements hereof about a central mandrel.

FIG. 3 is a diagrammatic and schematic axial cross-sectional view of a combined electrically heatable catalytic converter (EHC) with a light-off catalytic converter immediately downstream of the EHC converter.

FIG. 5 is a plan view of a corrugated thin metal strip used in a preferred embodiment of the invention showing end tabs, the strip having a folded over "hem" on the leading edge, and notches to avoid contact with an underlying electrically powered flat heater band.

FIG. 6 is a plan view of a flat thin metal band with metal tabs at each end for underlying the trailing portion of the corrugated thin metal strip of FIG. 5.

FIG. 7 is a plan view of a flat thin metal divider strip with a metal tab at one end and which is substantially shorter than the flat thin metal band of FIG. 6.

FIG. 8 is a plan view of a relatively narrow flat thin metal heater band having metal tabs at both ends and adapted to be electrically heated.

DETAILED DESCRIPTION OF THE DRAWINGS

As indicated above, the composite core elements of the present invention are formed of two thin metal strips, preferably thin metal alloy strips, each having parallel marginal edges and which are characterized by two longitudinally extending portions, a leading portion through which the gas being treated first passes, and a trailing portion through which the gas being treated last passes. In one of the strips, the two portions are desirably isolated from one another electrically and thermally. This is to say that, in the preferred embodiments hereof, means are provided to cause the electric current to flow through the leading portion of one of the strips, for example, and to inhibit or entirely prevent its flow through the trailing portion. Thus, the leading portion of the thin metal strip in the one strip, may be rapidly heated by the electrical resistance of the leading portion while the trailing portion is not heated.

The leading portion of the first strip is in physical contact with the leading portion of the second strip and effects heating thereof by conduction and radiation. A longitudinally extending space in the second strip inhibits the transmission of heat by conduction, so that the tendency is to keep the major portion of the heat in the leading portion of the core element. Some heat transfer from the leading portion may take place in the downstream direction by conduction, but the majority is by convection. Heat transfer by convection effectively causes quick heating of the trailing portion of the converter and enables the trailing portion to light-off, or promote oxidation, and thus convert pollutants. The latent chemical energy in the exhaust stream and the "light-off" or oxidation reaction occurring in the trailing portion will also result in heating of the trailing portion.

The principal objectives of this structure are to provide (a) a system with mechanical integrity and (b) a relatively axially thin, or "pancake," electrically heatable portion with very low thermal inertia which can reach light-off temperature very quickly, i.e., in a matter of a few seconds, which then initiates "light-off," or oxidation, for example, in the trailing portion of the converter which trailing portion desirably has a higher thermal inertia. The two portions are integral and have the same transverse geometric configuration, so that the problems that occur in transferring exhaust gases from a small diameter electrically heatable catalytic converter to a larger, oval conventional catalytic converter including the need for a three-structural member "cascade" arrangement, are not encountered in the present devices. Moreover, the devices of the present invention will survive the Hot Tests described above. Still further, with the present invention, the pollutant content of the exhaust gases can be brought within the limits set by the EPA and at least one state (California) at engine start-up.

Figure 1:
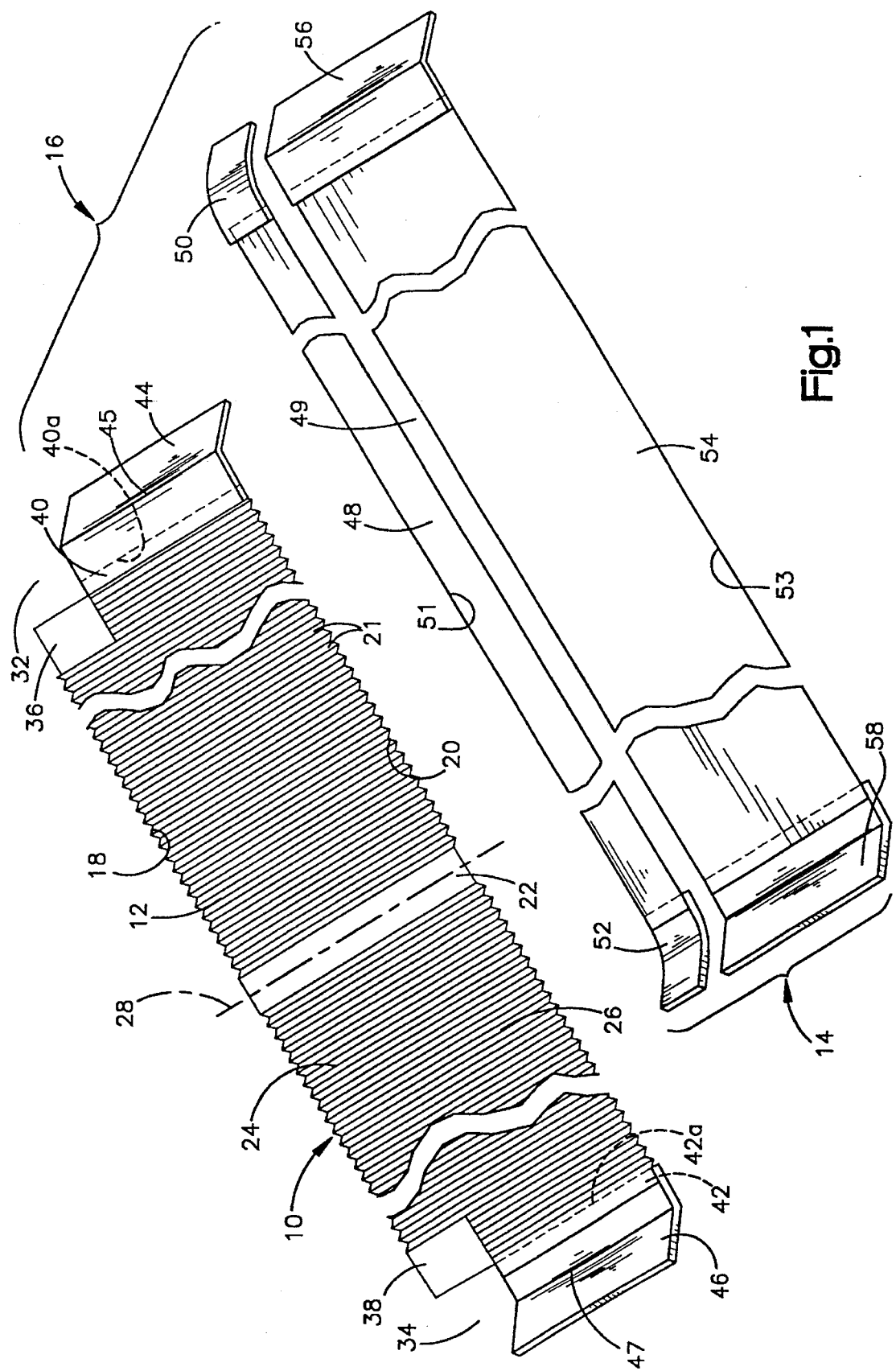
FIG. 1 is a perspective view of a composite core element in accordance with the present invention showing a corrugated strip having a flat strip in underlying relation therewith, and showing the leading portion and the trailing portion of the flat strip separated by a longitudinally extending space.

Referring now to FIG. 1, there is here shown in developed form, a pair of thin metal strips 12 and 14 which, when placed in contiguous relation, one above the other, form a composite core element 16 of the present invention. The first thin metal strip, generally indicated at 10, is corrugated, preferably in a regular, straight-through pattern. The term "regular" herein means that the corrugations have a uniform pitch; the term "straight-through" means that the corrugations are straight as opposed to herringbone or chevron patterned, and they extend, desirably perpendicularly, from one longitudinal edge of the thin metal strip to the opposite longitudinal edge. The corrugated thin metal strip 12 has a longitudinal leading edge 18, and a longitudinal trailing edge 20. The term "leading edge" means that the edge 18 first comes in contact with gas, e.g., pollutant laden exhaust gas, as it enters the catalytic converter, later shown. The term "trailing edge" means that the edge 20 is the last edge contacted by the gas as it leaves the combined electrically heatable converter (EHC) and light-off converter.

The strip 12 is conveniently continuously corrugated by passing between corrugating gears, or by stamping, to provide increased surface area. The strip 12 is also coated with a heat stable metal oxide, or "refractory metal oxide," or a mixture of refractory metal oxides, e.g., 75% gamma-alumina/25% ceria. The coating is applied by washcoating and drying the surface of the strip 12 one or more times, and the strip then is baked or calcined at a temperature normally of from about 930 degrees F., up to about 1800 degrees F. at a linear speed of the strip in process of from about 10 to about 100 feet per minute, e.g., 20 lineal feet per minute, and a contact time of 10 to 60 seconds, e.g., 30 seconds, to provide a metal oxide coating on the strip 12.

When either or both of the corrugated and flat strips is first coated with an aqueous dispersion of gamma-alumina, dried and calcined at a temperature above 1600 F., e.g., 1750 F. at a contact time of about 30 seconds, at, for example, 20 lineal feet per minute and followed by from 2 to 6 wash coatings with a gamma alumina/ceria dispersion, dried and calcined at about 930 F., there is formed what we call a "dielectric" coating characterized by very good insulative properties. The loading for the coating may be from 1 to 40 mgs. per square inch, e.g., 28 mgs/sq.in. A gamma-alumina material useful herein as a "dielectric" coating is commercially available and identified as "Catapal."

A typical procedure for applying a "dielectric" coating involves first coating the thin metal strip with 1 coat of "Catapal" (gamma-alumina) at a loading of 5 mg per square inch, followed by drying and then calcining at 1750 F., to form an insulative or tightly bonded coating, and then coating again with from 2 to 6 coats of gamma-alumina/ceria mixture to a loading of up to 30 mg per square inch, drying and then followed by calcining at about 930 F. The usual metal oxide coating produced at a lower calcining temperature, e.g., 500 to 1200 F., also has insulating properties, but not to the same degree as the "dielectric" coating. Both types of coatings may be used in a given embodiment of the cores of the present invention. The "dielectric" coated core elements are usually the electrically heated bands, e.g., the heater band 48 in FIG. 1, described below. For insulation redundancy, all strips may be refractory metal oxide coated.

The corrugated strip 12 has a leading portion 24 including the leading edge 18 and a trailing portion 26 including the trailing edge 20. A transverse, flat central portion 22 is provided which is from ⅛th" to ½" wide, e.g., ⅜ths" wide, at the transverse centerline 28 of the strip 12. This flat central portion 22 is to facilitate use of the composite core element 16 with a central rigid metallic mandrel 30, or in the preferred case, a bifurcated center pin 30, of formed wire, preferably with flat confronting surfaces (FIG. 2). The center pin 30 may be broadly construed as a mandrel which remains in the work piece or core, in this case, after tightly spirally winding the plurality of composite core elements 16.

Other than the central section 22, the notches 32 and 34, and the flattened portions 36 and 38, the balance of the thin metal strip 12 is corrugated from the leading edge 18 to the trailing edge 20. While the corrugated strip 12 may be coated with a "dielectric" coating as above described, the corrugated strip 12 is desirably coated with a refractory metal oxide coating applied as one or more wash coats and calcined. A preferred refractory metal oxide is 75% gamma-alumina/25% ceria mixture applied as a washcoat and calcined at about 1000 degrees F., although the coating may be gamma-alumina, alpha-alumina, titania, titania/ceria, titania/alumina, titania/silica, alumina phosphate, zirconia, silica, titania/silica, or mixtures thereof, etc. The metal oxide coating adheres well to the metallic substrate, especially when the alloy contains a small amount (less than about 5% by weight) of aluminum and provides a suitable base for application of a noble metal catalyst. Application of the usual refractory metal oxide coating and the noble metal catalyst is described in the aforesaid U.S. Pat. No. 4,711,009. The refractory metal oxide coating provides an excellent support for the catalyst.

The corrugations in the strip 12 may be patterned, such as herringbone, or chevron, or straight-through regular, or uniform pitch, or straight-through variable pitch. We prefer the corrugations to be straight-through and of regular, or uniform pitch. In general, the corrugations have a cross-sectional profile which is triangular, truncated triangular, sinusoidal, square wave, truncated triangular with the apices rounded off to relieve stress, etc. The corrugations have an amplitude generally of from about 0.02" to about 0.25", e.g., 0.1" and a pitch or wavelength of from about 0.03" to about 0.25", e.g., 0.2". In a specific example, the corrugations were truncated triangular with the apices rounded, straight-through and regular at an angle of 90 degrees to the longitudinal edges of the strip 12, had an amplitude of 0.083" and a pitch of 0.187" resulting in a cell density in the final core of about 100 cells per square inch. This structure provides minimum back pressure, or pressure drop, through the device compared to the pressure drop through a herringbone or chevron pattern corrugated structure. The herringbone or chevron type of pattern when used should have a slope of from 7 degrees to 35 degrees, e.g., 25 degrees to a line perpendicular to the marginal edges of the thin metal strip and a pitch of from about 0.75" to about 1.5" from apex to apex.

The ends 40 and 42 of the corrugated thin metal strip or foil 12 are desirably flattened for about ¼", and conveniently wire brushed or grit blasted to remove any metal oxide coating. The ends 40 and 42 are secured to metal end tabs 44 and 46 as by welding, preferably projection welding as shown in copending commonly owned application Ser. No. 886,009 filed 20 May 1992 by David T. Sheller. This application shows split, or two piece end tabs which sandwich the ends of the thin metal strips, e.g., the ends 40 and 42, between the two bent pieces which are then projection welded together. The tabs 44 and 46 may be of stainless steel, e.g., #433 stainless steel, or a chromium/columbium alloy, about 0.04" thick. The tabs 44 and 46 may be bent along a line 45 and 47 as shown in FIG. 1, or arcuate. Full details of the construction of the end tabs 44 and 46 are found in the commonly owned U.S. patent application Ser. No. 880,082 filed 4 May 1992, and in U.S. patent application Ser. No. 886,009, supra, to which reference may be had. In the present case, the metal tabs 44 and 46 are desirably angularly bent to an angle of from 15 to 35 degrees, e.g., 26 degrees, out of the plane of the tab.

Also shown in FIG. 1, is the second strip of the composite core elements hereof which is a two-piece flat strip generally indicated at 14, composed of a relatively narrow leading band 48 from about 0.5" to about 1.5" wide, and having arcuate end tabs 50 and 52 secured to each end of the band 48. The second strip also includes a relatively wider flat, trailing band 54 having angularly bent end tabs 56 and 58. The narrow flat thin metal band 48 is a heater band, i.e., it is the member to which electric power is applied and which effects heating of the "pancake" EHC. The heater band 48 is provided with end tabs 50 and 52 which, in the preferred case, are arcuately bent, such as described in connection with FIGS. 8, 9, 9A and 10 below.

Instead of separate end tabs for the trailing portions of both the corrugated strip 12 and the flat strip 14, the ends of the respective strips 12 and 14 may be attached to the same end tabs, respectively, thereby materially reducing the number of end tabs in the device. Thus, end tabs 44 and 56, for example, may be combined into a single end tab, and end tabs 46 and 58 combined into a single end tab for securing to the respective ends of the strips 12 and 14.

The heater band 48 is generally from about 0.5" to about 1.5" wide and from about 10 to about 16 or more inches long. The heater band 48 is normally 0.002" thick metal and may have a "hem" or overfolded leading edge 51, for reinforcement purposes. The "hem" may be from ⅛th" to about ⅝ths" wide. Hence, the thickness of the metal in the "hem" area is about twice the thickness of the metal in the balance of the heater band.

The second flat metal band 54 of the flat strip 14 is considerably wider than the heater band 48 and is spaced from the band 54 from ¹⁄₁₆" to ¼" for its entire length including the end tabs 54 and 56. Flat bands 48 and 54 are coplanar in the developed state as shown in FIG. 1, and as spaced serve not only to isolate the trailing portion 54 from the leading, electrically heated portion 48, but also to prevent nesting of the corrugated thin metal strips 10 which would occur, especially with a regularly corrugated thin metal strip, but for the intervening. flat thin metal bands. The band 54 constitutes the "trailing portion" of the flat strip layer 14. The flat metal band 54 is provided with end tabs 56 and 58 in the same manner as the corrugated strip 12. End tabs 56 and 58 are separated from end tabs 50 and 52 and are desirably angularly bent and made of the same material as end tabs 44 and 46. The material of construction may be stainless steel, e.g., a ferritic stainless steel or a Haynes alloy, such as above described, or a chromium/columbium alloy.

Figure 4:
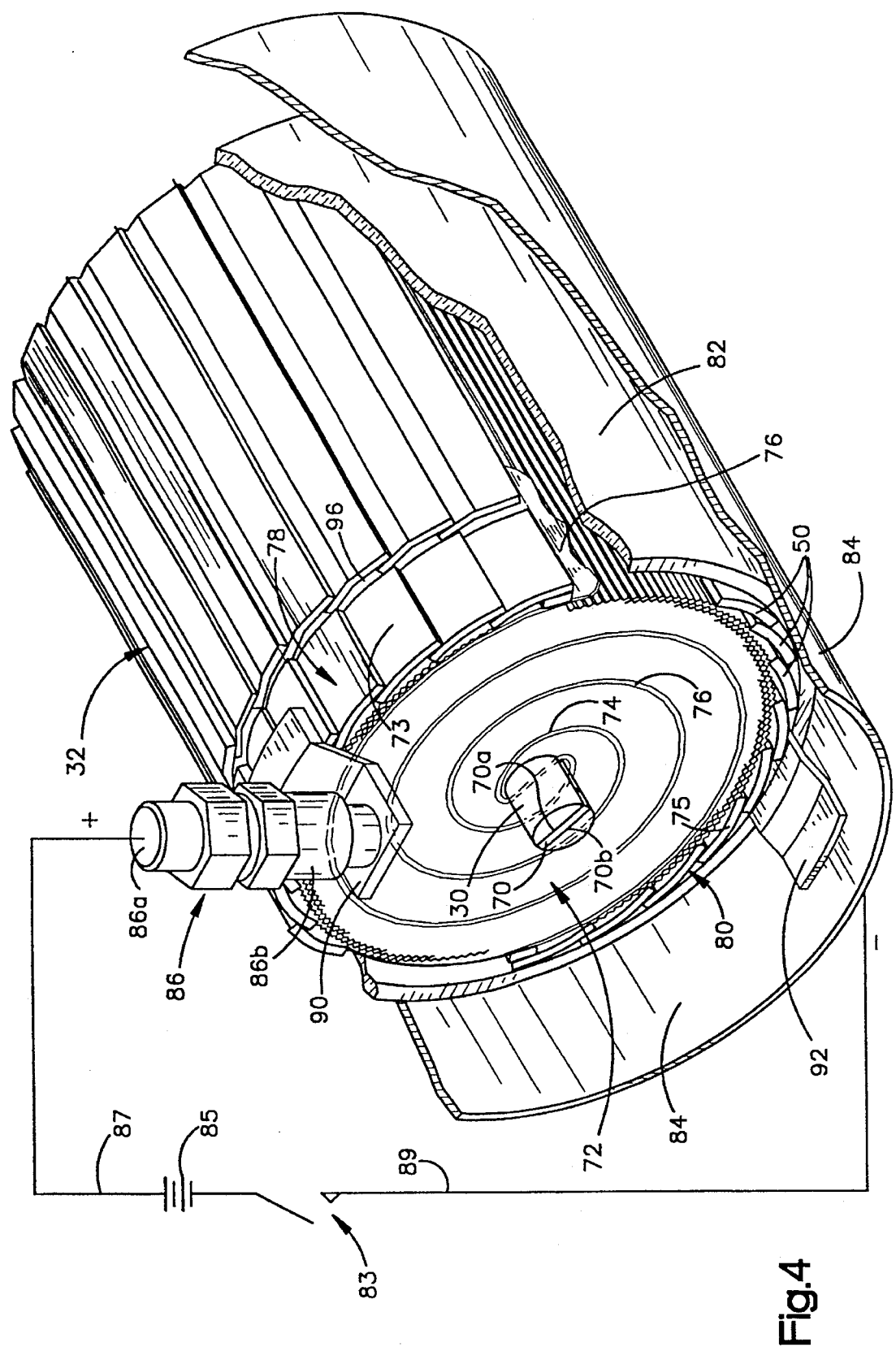
FIG. 4 is a perspective view showing a completed combined electrically heatable catalytic converter and light-off converter of the present invention in the same housing.

It should be noted that the end tabs 44 and 46, 50 and 52, and 56 and 58 as applied to the thin metal strips 12, 48 and 54, are oppositely bent. Thus, when a core is built up of a plurality of core elements 16 each comprising corrugated strips 12 and the flat bands 48 and 54, and spirally wound about the central pin 30, the successive layers will be corrugated/flat, corrugated/flat, corrugated/flat, etc., all in contiguous relation without nesting and of the same axial dimension to provide a composite core. The end tabs 44 and 56, and the end tabs 46 and 58 will be in overlapping relation and are desirably welded together in a circumferential direction to form circumferential retaining circular segments 78 and 80 (FIG. 2). The arcuate end tabs 50 and 52 will also be in overlapping relation albeit out of electrical contact with the corrugated thin metal strips 12. End tabs 50 and 52 are also welded to form circular segments 73 and 75 and will ultimately be connected to terminals for providing electric power to the segments 73 and 75 (FIG. 4). Both strips 12 and 14 are preferably imperforate.

The electrically powered heater bands 48 and, optionally, the remaining flat bands 54 and corrugated strips 12, are coated with an insulative "dielectric" coating. All strips and bands are washcoated with a gamma-alumina/ceria wash coat as the top coating. When a plurality of the composite core elements 16 (FIG. 1) are layered to form a core as described below with respect to FIG. 10, nesting of one layer into the next (which would block gas flow) is prevented. There will be one more corrugated strip 12 than the number of flat strips 14. The corrugated thin metal strip 12 is notched as at 32 and 34, and the corrugations in the areas designated by 36 and 38 are flattened to prevent contact with the electrically heatable band 48 or the end tabs 50 and 52, at both ends of the same longitudinal marginal edge. The notches 32 and 34 extend through the transverse end edges 40a and 42a. Electric power is applied between the tab portions 50 and 52 in the built-up core. It should be noted that in the corrugated/flat composite core element 16, both such strips 12 and 14 may have end tabs, and in a preferred case, the end tabs attached to the leading portion flat band 48, for example, are arcuate while the other tabs are anglarly bent. It may be found desirable to remove the refractory metal oxide coating from the apices of the corrugations and to braze the flat band 48 and the flat band 54, for example, to the projecting apices 21 of the corrugated strip 12 for reasons of durability in, for example, the Hot Tests. This has not been found to be necessary.

Figure 10:
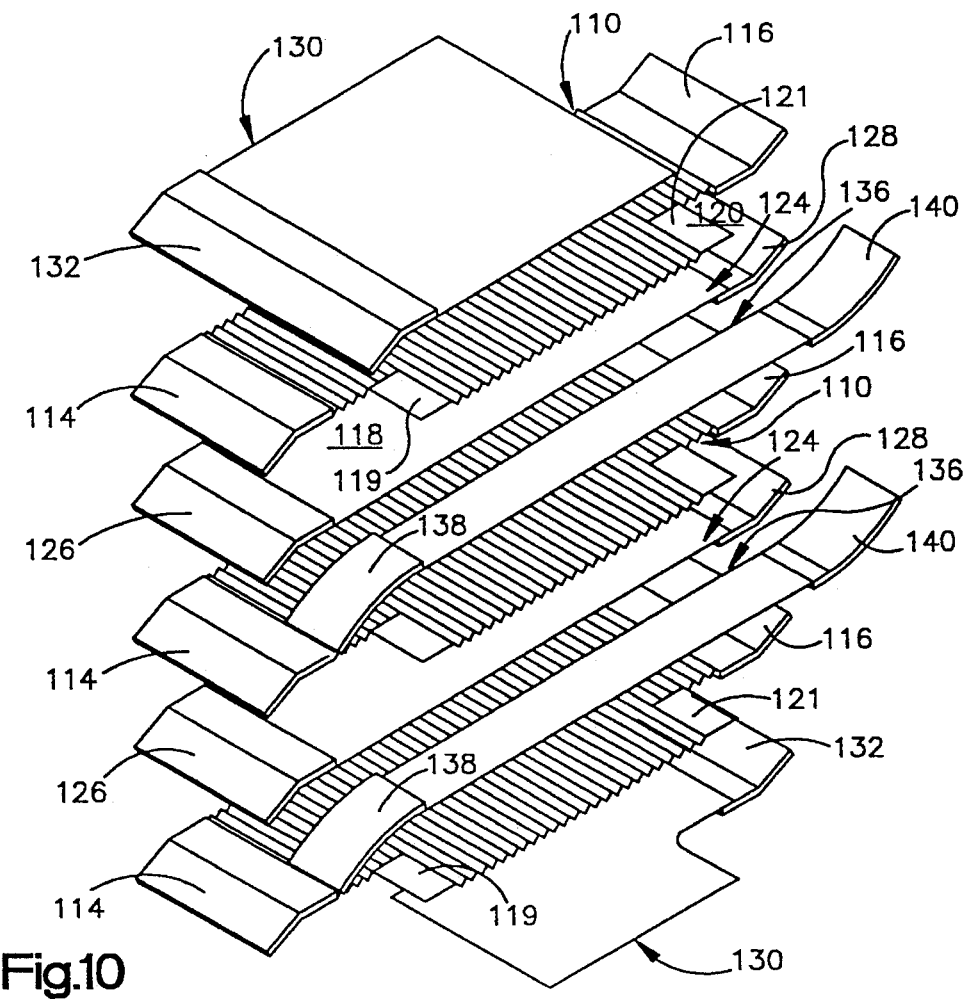
FIG. 10 is a diagrammatic end view of a group of corrugated thin metal strips in alternating relation with flat thin metal strips between the legs of a bifurcated central pin prior to spirally winding the assembly.

As indicated above, a plurality of the composite core elements 16, e.g., 4 to 12 such elements, and an extra corrugated strip 12, along with divider strips 130 (FIG. 7), are gathered, and the central flat portions 22 of the corrugated flat strips 12 and the flat central portions of the flat bands 48 and 54, and the end portions of the divider strips 130, placed between flat confronting surfaces 70a and 70b of the legs of a bifurcated pin 30, for example, along with woven ceramic fiber insulation tapes 74 and 76 (FIG. 4). Alternatively, the insulation strips 74 and 76 may be omitted and the insulative effect of a refractory metal oxide coating, particularly the high temperature (1750 degrees F.) calcined gamma-alumina coatings, relied upon to insulate the core members from each other. FIG. 10 shows the layering of corrugated and flat thin metal strips in a specific embodiment.

FIG. 2 shows the centrally located pin 30 with 6 to 8 core elements 10 extending through the gap 70 defined by the confronting flat surfaces 70a and 70b. The assembly of the composite core elements 16 of the present invention, and the pin 30 is then wound using the central pin 30 as a key to tightly spirally wind the core elements 16. This results in the core 72 as shown in FIG. 2 as viewed from the upstream end. It will be observed that the arcuate metal end tabs 50 and 52 of the heater bands 48 are in partial overlapping relation and form retaining shell portions 78 and 80, respectively. The metal end tabs 44 and 46, and 56 and 58 of the trailing portions 26 and 54 (FIG. 1) of the composite core elements 16 (not visible in FIG. 2), are also in partial overlapping relation and form a retaining shell portion, generally indicated at 32 in FIG. 4. The overlapping end tabs 50 and 52, and the overlapping end tabs 44 and 46, in alternating relation with the end tabs 56 and 58, respectively, are welded to each other in a circumferential direction after the spiral winding is completed, to form rigid arcuate retaining shell portions 78, 80 and 32. The retaining shell portions 78 and 80 are electrically isolated from one another in a circumferential direction, and axially from the trailing portion retaining shell portions, e.g., retaining shell portion 32 (FIG. 4).

Surrounding the core 72 there is provided an insulation layer 82, e.g., "INTERAM" ceramic fiber mat, generally about ³⁄₁₆" thick, and a housing 84. An electrode feed through, generally indicated at 86 is provided for conducting electric power from a voltage source 85, to the retaining shell portion 78 through an axially extending metal strap 90. This terminal is usually connected to the positive pole of a battery, e.g., a 12 volt automotive battery, not shown. Another terminal generally indicated at 88 (FIG. 3) is attached directly to the housing 84 as by welding, and in turn attached by means of a cable 89, to the negative pole of the battery 85. Electric current is conducted from the housing 84 to the retaining shell portion 80 by means of a metal strap 92 welded to the housing 84 and to the retaining shell portion 80.

The terminal feed through generally indicated at 94 (FIG. 2) is a thermocouple terminal 94 to enable sensing of the temperature of the core. This is not an essential element of the converters of the present invention.

FIG. 3, is a longitudinal cross-sectional, diagrammatic and schematic view of a combined unitary EHC and light-off assembly in accordance with this invention. There is shown in diagrammatic form a core 72 having two parts 30*a* and 32*a*. Part 30*a* is that part which is the EHC, i.e., it is electrically heatable. Part 32*a* is the light-off part, that is, it is not directly heated electrically. The line 96 indicates the separation of the end tabs 50 and 56, and end tabs 52 and 58, between parts 30*a* and 32*a*. It should be noted that the leading portions 24 including leading edges 18, and the trailing portions 26 including trailing edges 20, when the composite strips 16 are tightly spirally wound to form the core 72, are at the entrance of the gas to the core 72 and at the exit of the gas from the core 72, respectively. In other words, the corrugated strips 12 when embodied in a core 72 span the entire axial length of the core 72. Because of the space 49 (FIG. 1), the flat bands 48 and 54 do not span the entire axial length of the core 72 although the leading edges 51 and the trailing edges 53 of the flat bands 48 and 54, respectively, lie in the same transverse, axially spaced planes as the leading edges 18 and the trailing edges 20 of the corrugated strips 12, respectively.

In FIG. 3, the numbers of the parts correspond to those used in FIG. 2. As indicated above, the central pin 30 is preferably bifurcated, and is desirably a formed wire conveniently having the configuration of a cotter pin. After the plural core elements 16, the additional corrugated thin metal strip 12, and the divider strips 130 (FIG. 7) are gathered and placed in the gap 70 between the flat confronting surfaces 70*a* and 70*b* (FIG. 2) of the two legs of the bifurcated pin 30, and the assembly tightly spirally wound in, for example, a counterclockwise manner as shown in FIG. 2, the bifurcated ends of the pin 30 at the EHC end are welded together, as at 98 in FIG. 4. The opposite end of the pin 30 is a generally circular eye, indicated at 100 in FIG. 3. For holding the core elements against telescoping, for example, there extends through the eye 100 a cylindrical rod 102, insulated from the end 26*a* of the core 72 by any suitable means. The desired insulating means for the rod 102 is a plasma applied ceramic coating 104 on the rod 102 itself, e.g., plasma applied refractory metal oxide coating, such as alumina. The principal purpose of the pin 30 outside of providing a convenient means for spirally winding the core 72, is to hold the rod 102 and the insulator 104 tightly against the end 26*a* of the core 72. The rod 102 is welded at each end to the outer housing 84. This improves the durability of the device in the Hot Tests described above. The overall axial length of the combined EHC and light-off converters is from about 2" to about 10", e.g., in a specific embodiment, 4".

FIG. 4 is an isometric view, partially cut away, and in diagrammatic form, of a combined EHC and light-off converter in accordance with this invention. Parts corresponding to those shown in FIGS. 2 and 3 have the same numbers. The feed through terminal 86 (FIG. 3) is shown in FIG. 4 as the stud 86*a* having a plasma applied coating of alumina 86*b* to insulate the feed-through stud 86*a* from the collar 86*c* (FIG. 3) which collar 86*c* is welded to the housing 84 as shown in FIG. 3. The stud 86*a* passes through the housing 84 (FIG. 3) and is welded at its inner end to a strap 90 for feeding electrical power to the EHC portion 30*a* through a retaining shell segment 78 (FIG. 2). The external end of the stud 86*a* is attached by cable 87 (diagrammatically shown) to the positive pole of a battery 85. Another strap 92 is attached to the housing 84, which is, in turn, attached (for example, through the terminal 88 in FIG. 3) by cable 89 to the ground or negative pole of the battery 85. The inner end of the strap 92 is attached, as by welding, to the other retaining shell segment 80 (FIG. 2). Thus, an electrical circuit is formed from the battery 85 through the retaining shell segment 78 and the flat heater bands 48 of the composite core 72 to the opposite retaining shell segment 80 to the housing 84 and back to the battery 85. When the circuit is closed, as by a suitable switching means 83, (see for example, the switching means described in commonly owned U.S. patent application Ser. No. 926,045 filed 5 Aug. 1992 by Cornelison et al, to which reference may be had), the EHC portion 30*a* is rapidly heated to its optimum temperature, e.g., 650 F. to 800 F. This is the temperature at which the catalyst is optimally active to convert pollutants, such as carbon monoxide, to carbon dioxide, for example, which is then exhausted to the atmosphere.

FIG. 5 shows a specific example of a corrugated strip 110 of Haynes 214 alloy, 0.002" thick, and 11" long by 3.75" wide, with regular straight-through corrugations perpendicular to the marginal edges of the strip 110. The strip 110 has a "hem" 112 which means that the thin metal foil has been folded over about 0.5" at its leading edge 123 prior to corrugating to provide a reinforcing "hem" 112 on the strip. The provision of a "hem" in effect doubles the thickness of the strip along the leading edge of the corrugated foil strip thereby stiffening the foil strip against folding over in the Hot Tests. The corrugated thin metal strip 110, in the specific example had corrugations having an amplitude of 0.082" and a pitch of 0.187". The strip was provided with a "dielectric" coating of gamma-alumina calcined at a high temperature above 900 F., e.g., 1750 F., and subsequently wash coated with gamma-alumina and calcined at 1000 F., on the surfaces thereof. End tabs 114 and 116 are oppositely directed, that is, when looked at from the same side of the strip 110, one end tab is convex, and the other end tab is concave. The end tabs 114 and 116 are angularly bent tabs 0.35" wide by 2.125" long such as described and shown in FIG. 1 in the aforesaid application Ser. No. 886,009. In the specific example, the end tabs 114 and 116 are made of a commercially available chromium/columbium alloy 0.043" thick, and 2.125" long by 0.35" wide welded to the ends of the corrugated strip 110. The overlap between the end tab, e.g., end tab 116, and the corrugated strip 110 in the specific example was ¼". The corrugated thin metal strip 110 is 3.75" wide from edge to edge. Notches 118 and 120 are provided in the ends of the leading portion 122, and the corrugations are flattened for about ¼" to about 1", specifically, ¾", in the areas 119 and 121 to avoid contact with the heater strips 136 (FIG. 8). The notches 118 and 120 are 0.35" by 1.625". A total of 11 corrugated strips 110 are used in building up the core in the specific example.

FIG. 6 shows a flat trailing portion band 124 of Haynes 214 alloy. In the specific example, this strip is also 11.0"

long by 2.125" wide, and 0.002" thick. No "dielectric" coating is provided on this band 124 in the specific example, although the band 124 was wash coated with gamma-alumina or gamma-alumina/ceria, and calcined at about 1000 F. The end tabs 126 and 128 are the same size and material as used on the ends of the corrugated strip 110. A total of 10 of the flat bands 124 are used in building up the core.

FIG. 7 shows a flat divider strip 130 also of Haynes 214 alloy. In the specific example, this strip is 6.5" long by 3.75" wide and 0.002" thick with a 0.5" hem 131 along the leading edge 133 and without any "dielectric" coating of refractory metal oxide. However, the divider strips 130 have a wash-coating of gamma-alumina, or gamma-alumina/ceria. Divider strip 130 has a single angularly bent end tab 132 welded to the end 134 of the divider strip 130. The other end is free. End tab 132 is 2.125" long by 0.35" wide and made of the chromium/columbium alloy used above. A total of two divider strips 130 is used in building up the core.

Figure 9:
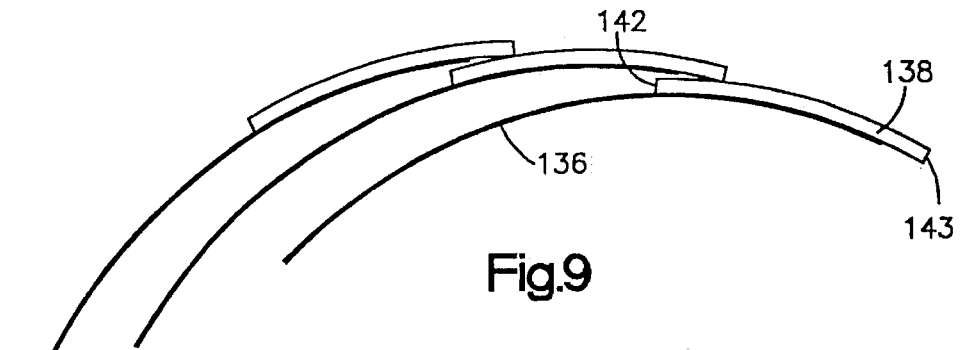
FIG. 9 is an end view on an enlarged scale showing the mounting of the tabs on the flat thin metal heater band.
Figure 9A:
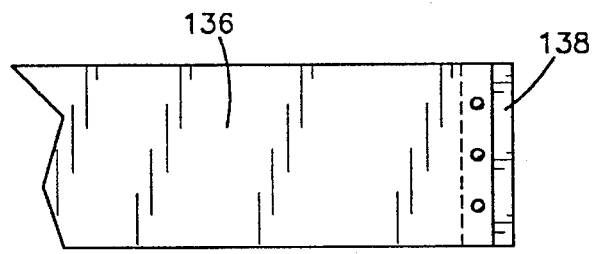
FIG. 9A is a fragmentary plan view of a heater band such as shown in FIG. 8 and showing the point of weldment of the metal tab to the heater band.

FIG. 8 shows a heater band 136 which is also flat and made of Haynes 214 alloy 0.002" thick. In the specific example, the band 136 is 11.0" long and 1.25" wide. The heater band 136 was provided with a "dielectric" coating of gamma-alumina, calcined at 1750 F. at 20 linear feet per minute. Heater band 136 has oppositely directed end tabs at both ends, each 0.6875" wide by 1.25" long and made of the aforesaid chromium/columbium alloy welded to the ends of the heater band 136. Desirably, these are arcuate end tabs 138 and 140 roll formed to a radius of about 1.75". The bundle of core elements, (FIG. 10) used to form the core has both arcuate and angularly bent end tabs in the assembly. The welding of the narrow flat band 136 to the end tabs 138 and 140 is as shown in FIGS. 9 and 9A wherein the ldment is by projection welding high into, i.e., closer to the distal edge 143 of the bent metal tab 138 rather than close to the proximal edge 142. A total of 10 heater bands 136 are used in building up the core.

FIG. 10 is illustrative of a bundle of the various strips shown and described above in relation to FIGS. 5 to 9A which bundle is to be disposed between the legs of the bifurcated central pin 30. This arrangement is prior to compacting and tightly spirally winding the assembly to form a circular core 72 as shown in FIG. 2. In the specific example, the core 72 (FIG. 2) has a diameter of 3.35". The two heater bands 136 lie in the same plane as the flat bands 124 and are spaced ⅛" from the flat bands 124 and disposed adjacent the leading edge of the corrugated strip 110. In FIG. 10, only 2 heater bands 136 are shown for convenience. In the specific example, 10 flat heater bands 136 (FIG. 8), and 10 flat bands 124 (FIG. 6) were used. Also in the specific example, 11 corrugated strips 110 (FIG. 5) were used and 2 divider strips 130 (FIG. 7). Neither the corrugated strips 110 nor the flat strips 14 had any perforations or slots. It will be observed that there are more tabs in overlapping relation attached to the trailing portions of the corrugated strips 110 and the flat bands 124, than there are tabs in overlapping relation in the electrically heated portion. This does not pose a problem. In the event of unevenness in the numbers of tabs causing a problem, thicker tabs 138 and 140 may be used for the heater bands 136, or longer tabs 138 and 140 of the same thickness to assure overlap may be used, It should also be noted that the end tabs 138 and 140 on the ends of the flat heater bands 136 are arcuate instead of angularly bent as, for example the end tabs 114, 116, 126, 128, and 132. The arcuate end tabs are segments of an annulus about 3.5" in diameter and ¹¹⁄₁₆" long when flat.

This core was tested with a 12 volt automobile battery providing at the core 8.6 volts and 336.14 avg. amperes. The average core resistance was 26 milliohms. After 11 seconds of application of modulated power to the core, the temperature rose to 644 degrees F.

Numerous variations in the preferred structure above described may be used without departing from the invention. For example, although electrical connections at the outside diameter of the core have been shown, they may be made at the center of the core and at the outside diameter. While straight-through cells have been shown, patterned cells, such as those formed with herringbone or chevron shaped corrugations, may also be used. Where the latter type corrugations are used, the flat thin metal layers may be omitted and the leading portion of the corrugated strips heated. While thin metal layers have been shown and described with tabs at the ends of the strips, thin metal layers without tabs on the ends of the strips may be used, if desired. While flat thin metal heater bands have been shown and described, it will be understood that the heater bands may be corrugated, provided they are in alternating relation with flat strips. While a circular core body has been shown, it will be understood that any cross-sectional configuration, e.g., oval, elliptical, rectangular, or the like may be used. While it is desirable to make the devices hereof from a single stainless steel alloy or nickel chromium stainless steel alloy, it will be found desirable in certain cases to strengthen the core body by using various reinforcing means, such as fashioning some of the thin metal strips from a ferritic stainless steel, for example, and others from a nickel/chromium stainless steel alloy; or by doubling or tripling the thickness of one or more of the strips or layers.

There has thus been provided a core element useful in making a combined electrically heatable converter with a light-off converter, and a combined electrically heatable converter/light-off converter containing a plurality of such core elements. The core elements hereof are composite, that is, composed to two strips, one corrugated and one flat, each characterized by leading and trailing portions. The leading portion is electrically heatable, and the trailing portion is not, for all practical purposes. Thus, instead of fabricating two separate converter units one of which is an electrically heatable converter, and the other of which is a light-off converter, both of these objectives may be obtained in a unitary converter easily manufactured from the special core elements of this invention. While cascading is still utilized with the present structures, instead of three units of graduated size and configuration, the devices of the present invention combine two of them into a single unit which may then be placed in line with a conventional catalytic converter, not electrically heated, such as a ceramic catalytic converter, or a corrugated thin metal monolith catalytic converter, for more efficient conversion of pollutant materials in the inlet gas to harmless conversion products in the outlet gas.

What is claimed is:

1. A core element useful in a combined electrically heatable catalytic converter and a light-off converter comprising an elongated thin metal strip having marginal edges, one edge being a leading edge and another edge being a trailing edge with respect to fluid flowing transversely therethrough, and having a longitudinally extending leading portion including said leading edge and a longitudinally extending trailing portion including said trailing edge, said thin metal strip having a transversely extending metal tab secured to each end of said elongated strip, said tabs being transversely bent in opposite directions, and means for isolating one of said portions from the other electrically and thermally.

2. A composite core element comprising (a) an elongated corrugated thin metal strip having a flat transversely extending central portion and having parallel longitudinally extending marginal edges spaced a predetermined distance apart and having a leading portion and a trailing portion, and (b) a flat thin metal strip having parallel longitudinally extending marginal edges, and being in contiguous relation to said corrugated thin metal strip, said flat thin metal strip being longitudinally divided intermediate the marginal edges thereof into (1) a first flat thin metal band, and (2) a second flat thin metal band coplanar with said first thin metal band, and said first flat thin metal band being spaced from and out of electricity conducting contact with said second flat thin metal band.

3. A core element as defined in claim 2 wherein each of said first and second flat thin metal bands has oppositely bent metal tabs secured to each end thereof.

4. A core element as defined in claim 2 wherein said first flat thin metal band has oppositely directed arcuately bent metal tabes secured to each end thereof.

5. A core element as defined in claim 2 wherein said second flat thin metal band has oppositely directed angularly bent metal tabs secored to each end thereof.

6. A core element as defined in claim 2 wherein the corrugated thin metal strip has a notch at each end thereof in the same longitudinal marginal edge, and said notch extending through the transverse end edges of said strip, and having an oppositely bent metal tab secured to each end extending across the unnotched end.

7. A core element as defined in claim 2 wherein the corrugated thin metal strip has an oppositely bent metal tab at each end thereof, and said first and second flat thin metal bands each have an oppositely bent metal tab at each end thereof.

8. A core element as defined in claim 2 wherein the corrugated thin metal strip has regular, straight-through corrugations extending between the longitudinal marginal edges thereof.

9. A core element as defined in claim 2 wherein both the corrugated thin metal strip and the flat metal strip have a coating comprising a refractory metal oxide on at least one surface thereof.

10. A core element as defined in claim 2 wherein the corrugated thin metal strip has a coating comprising a refractory metal oxide on at least one surface thereof.

11. A core element as defined in claim 2 wherein the flat metal band has a "dielectric" coating on at least one surface thereof.

12. A core element as defined in claim 2 wherein both the corrugated thin metal strip and the flat metal strip have a "dielectric" coating on at least one surface thereof.

13. A core element as defined in claim 9 wherein the coating of a refractory metal oxide contains alumina.

14. A core element as defined in claim 10 wherein the coating of a refractory metal oxide contains alumina.

15. A core element as defined in claim 11 wherein the "dielectric" coating comprises alumina.

16. A core element as defined in claim 12 wherein the "dielectric" coating comprises alumina.

17. A core element as defined in claim 9 wherein the coating of a refractory metal oxide is a mixture of alumina and ceria.

18. A core element as defined in claim 9 wherein the coating supports a noble metal catalyst.

19. A core element as defined in claim 18 wherein the noble metal catalyst is selected from the group consisting of platinum, palladium, ruthenium, rhodium and mixtures of two or more such metals.

20. A core element as defined in claim 2 wherein the corrugated thin metal strip is corrugated in a nonnesting straight-through pattern.

21. A core element as defined in claim 2 wherein the corrugated thin metal strip is corrugated in a variable pitch straight-through pattern.

22. A core element as defined in claim 2 wherein the corrugated thin metal strip is corrugated in a herringbone or chevron pattern.

23. A core element as defined in claim 2 wherein the first flat thin metal band overlies the leading portion of said corrugated thin metal strip.

24. A core element as defined in claim 2 wherein the first flat thin metal band has a coating comprising alumina on at least one surface thereof.

25. A core useful in a combined electrically heatable catalytic converter and a light-off converter comprising (a) a central rigid metallic pin, (b) a plurality of composite core elements as defined in claim 2 tightly spirally wrapped about said central rigid metallic pin with the metal tabs thereof in overlapping relation and defining two electrically isolated retaining shell segments, said metal tabs being secured into said overlapped relation, and (c) means for applying an electric current to the first flat thin metal band of said composite spirally wound core elements.

26. A combined electrically heatable catalytic converter and a light-off converter comprising (a) a core as defined in claim 25, (b) a metallic housing for said core, (c) means for insulating said core from said housing, (d) a feed-through terminal for attachment to one pole of a direct current voltage source and to one retaining shell segment of said core, (e) a terminal for attachment to the other retaining shell segment of said core and to the other pole of said voltage source, and (f) a voltage source.

27. A composite core element for a converter characterized by (a) a corrugated elongated thin metal strip having a flat transversely extending central portion and parallel longitudinally extending marginal edges spaced a predetermined distance apart, one edge being a leading edge and the other being a trailing edge with respect to fluid flowing transversely thereover, and having a leading portion including said leading edge and a trailing portion including said trailing edge, and (b) an elongated flat thin metal strip having parallel longitudinally extending marginal edges, and being in contiguous relation to said corrugated thin metal strip, said flat thin metal strip being longitudinally divided intermediate the parallel longitudinally extending marginal edges thereof into (1) a first flat thin metal band, and (2) a second flat thin metal band coplanar with said first flat thin metal band, and said first flat thin metal band being spaced from and out of electricity conducting contact with said second flat thin metal band.

28. A method for accelerating the response of a catalytic converter in a system downstream of a source generating a pollutant-containing fluid, the catalytic converter comprising an electrically heatable catalytic converter and a light-off converter, including (a) a wrapped core having a rigid central metallic pin and electrically isolated retaining shell segments, (b) a plurality of core elements including (1) an elongated corrugated thin metal strip having a flat transversely extending central portion and having parallel longitudinally extending marginal edges spaced a predetermined distance apart and having a leading portion and a trailing portion, and (2) a flat thin metal strip having parallel longitudinally extending marginal edges, and being in contiguous relation to said corrugated thin metal strip, said flat thin metal strip being divided intermediate the marginal edges thereof into (i) a first flat thin metal band, and (ii) a second flat thin metal band coplanar in the developed state with said first thin metal band, and said first flat thin metal band being spaced from and out of electrical conducting contact with said second flat thin metal band, said core elements being tightly spirally wrapped about said rigid metallic pin to provide a plurality of openings through which said pollutant-containing fluid may flow; (b) a metallic housing for said core; (c) means for insulating said core from said housing; (d) a feed-through terminal for attachment to one pole of a voltage source and to one of said retaining shell segments of said core, (e) a terminal for attachment to the other pole of said voltage source; and (f) a voltage source; said method comprising the steps of applying an electric current to said first thin metal strip of each of said core elements; and maintaining said electric current until a predetermined temperature is reached.

29. A core element as defined in claim 1 wherein the electrically heatable leading portion is entirely isolated from said trailing portion.

30. A composite core element comprising (a) a first elongated thin metal strip having parallel longitudinally extending marginal edges spaced a predetermined distance apart and having a leading portion and a trailing portion, and (b) a corrugated thin metal strip having parallel longitudinally extending marginal edges, said corrugated thin metal strip being in contiguous relation with said first elongated thin metal strip, said corrugated thin metal strip being longitudinally divided intermediate the marginal edges thereof into (1) a first corrugated thin metal band, and (2) a second corrugated thin metal band coplanar with said first corrugated thin metal band, and said first corrugated thin metal band being spaced from and out of electricity conducting contact with said second corrugated thin metal band.

31. A combined catalytic converter having an electrically heatable portion and a light-off portion said converter comprising a core element of claim 1.

32. A combined catalytic converter having an electrically heatable portion and a light-off portion said converter comprising a composite core element of claim 2.

33. A confined catalytic converter having an electrically heatable portion and a light-off portion said converter comprising a core element of claim 29.

34. A combined catalytic converter having an electrically heatable portion and a light-off portion said converter comprising a composite core element of claim 29.

35. A combined catalytic converter having and electrically heatable portion and a light-off portion said converter comprising a composite core element as defined in claim 30.

* * * * *